Feb. 13, 1962 C. G. JOA 3,021,135
METHOD AND APPARATUS FOR CUTTING AND FOLDING
PAPER OR CLOTH WEBS
Filed Aug. 10, 1959 5 Sheets-Sheet 3
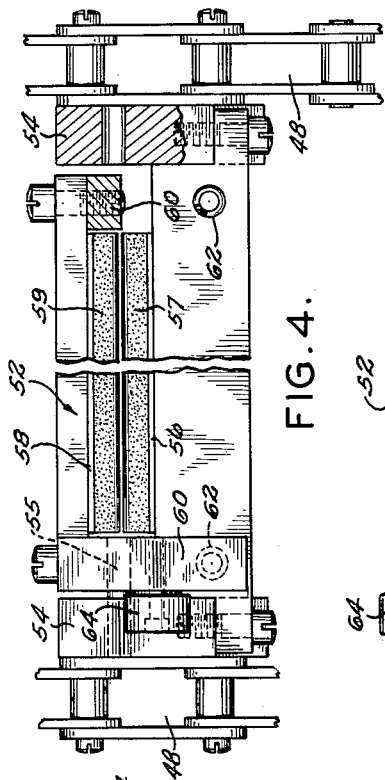
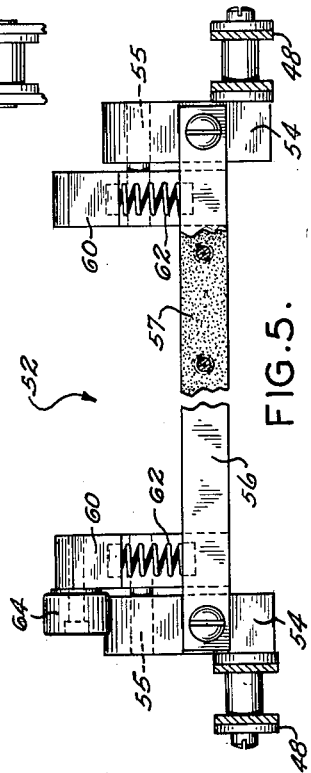
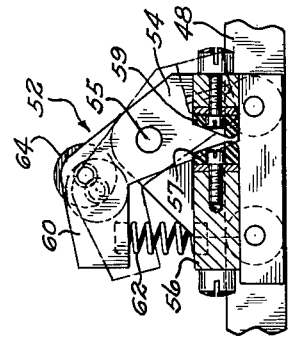
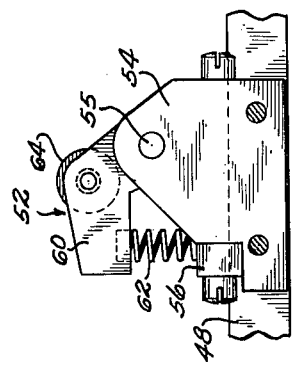
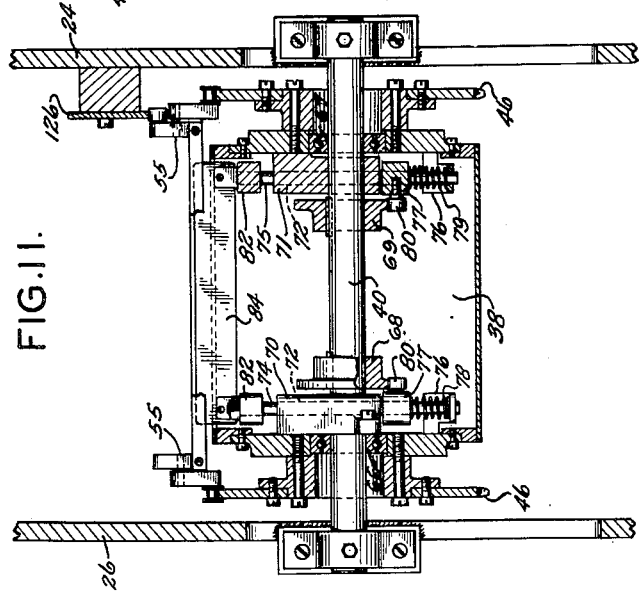
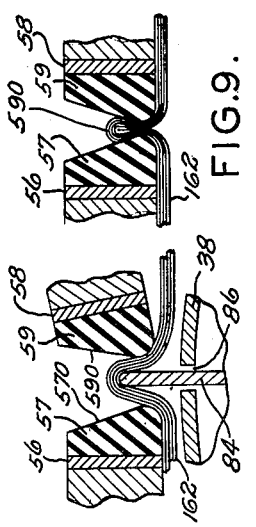
INVENTOR.
CURT G. JOA
BY
Wheeler, Wheeler & Wheeler
ATTORNEYS

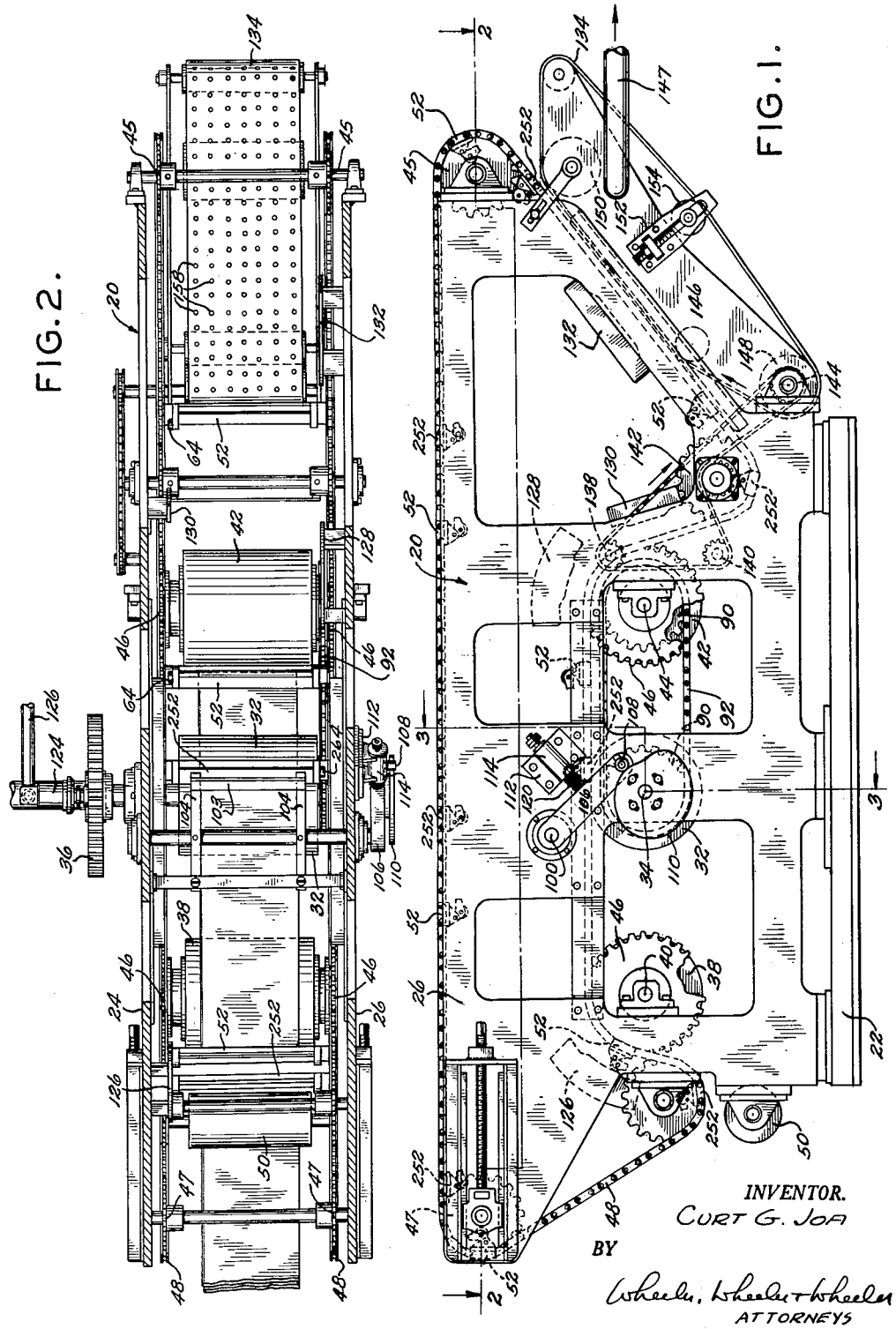

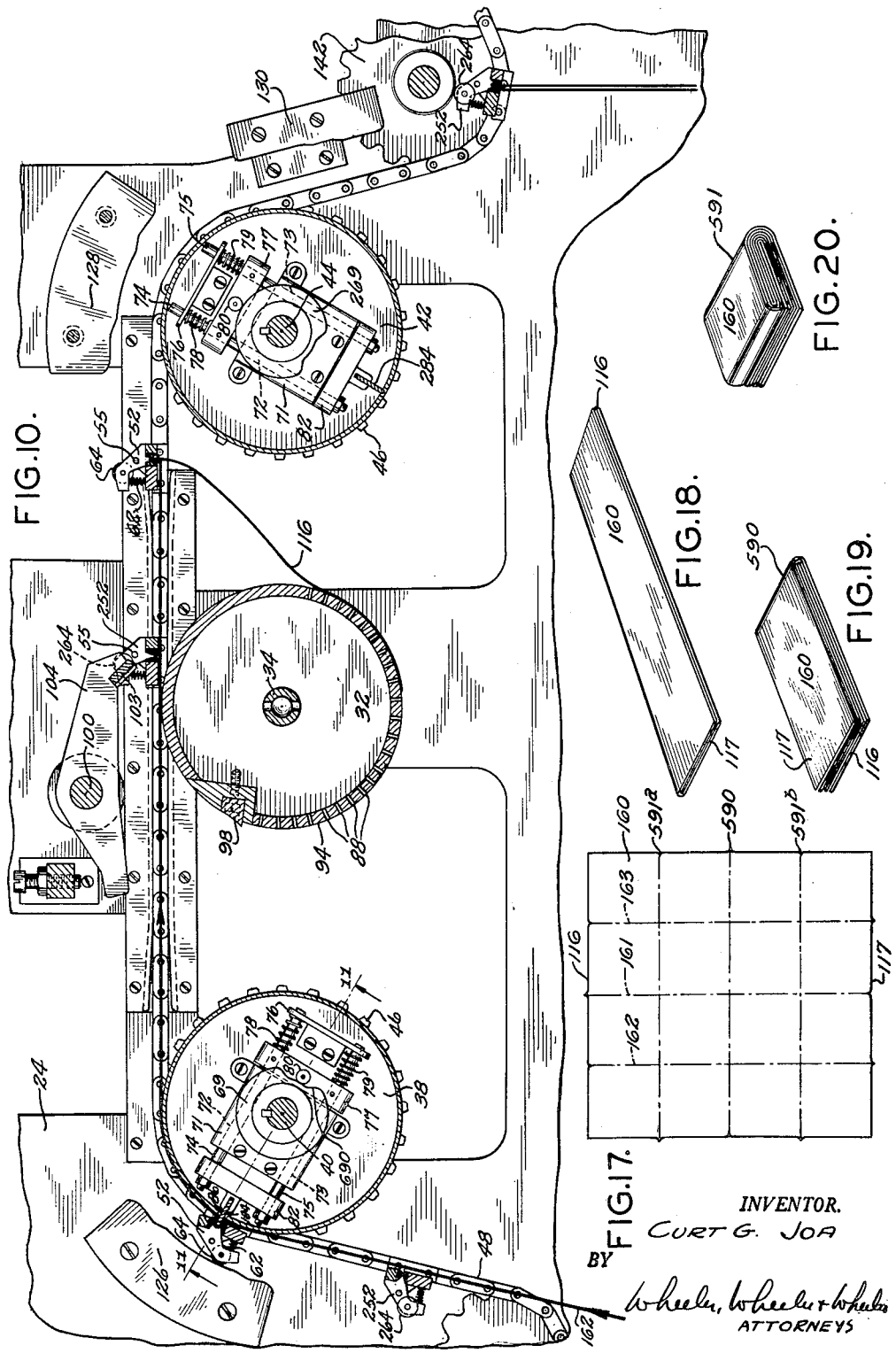

Feb. 13, 1962 C. G. JOA 3,021,135
METHOD AND APPARATUS FOR CUTTING AND FOLDING
PAPER OR CLOTH WEBS
Filed Aug. 10, 1959 5 Sheets-Sheet 5
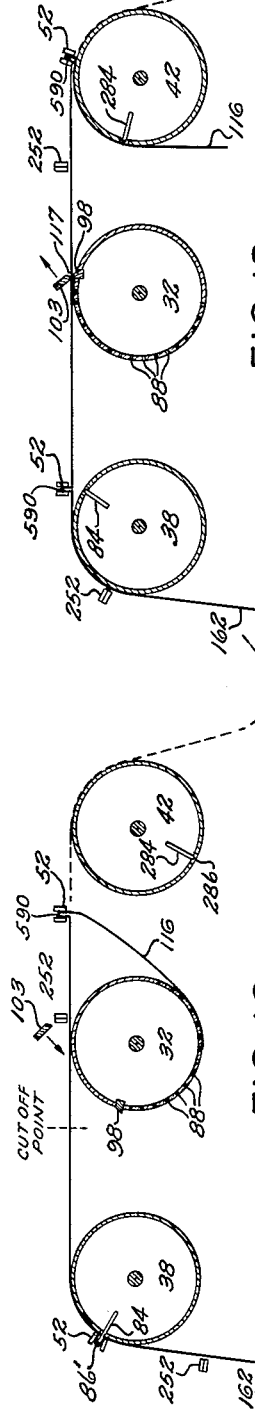
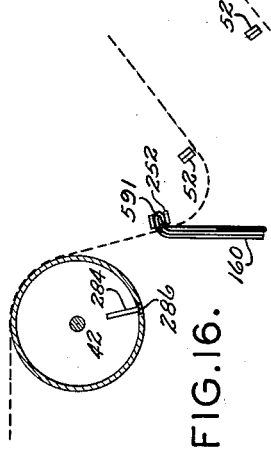
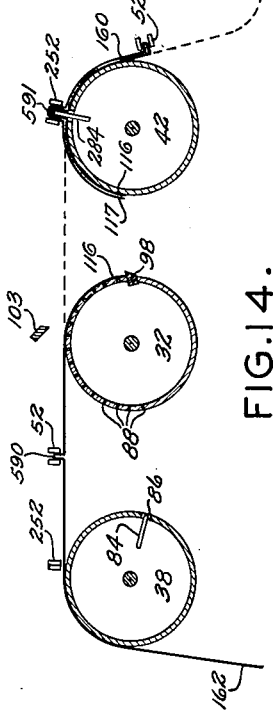
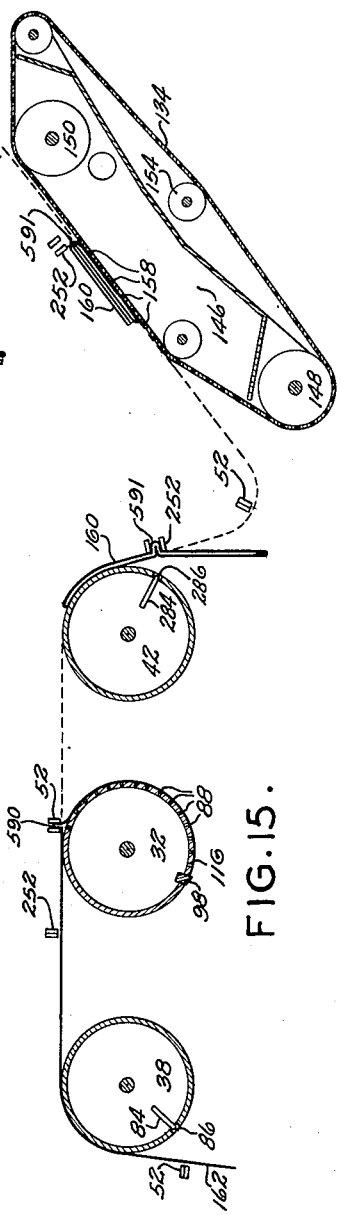
INVENTOR.
CURT G. JOA
BY
Wheeler, Wheeler & Wheeler
ATTORNEYS text omitted …

United States Patent Office 3,021,135
Patented Feb. 13, 1962

3,021,135
METHOD AND APPARATUS FOR CUTTING AND FOLDING PAPER OR CLOTH WEBS
Curt G. Joa, Ocean Ridge, Fla.
(P.O. Box 1121, Boynton Beach, Fla.)
Filed Aug. 10, 1959, Ser. No. 832,660
17 Claims. (Cl. 270—70)

This invention relates to a method and apparatus for cutting and folding paper or cloth webs. More particularly, this invention relates to a machine for cutting and cross-folding webs which have been folded longitudinally one or more times.

The presently described embodiment exemplifying the invention is a machine for cutting and twice cross-folding a continuous web of material which has been twice folded longitudinally. A conveyor receives and supports the web. Cooperating with the conveyor are drums with holding means and devices for cutting the web into predetermined lengths, and twice cross-folding the cut lengths. A discharge conveyor receives and delivers the cut and cross-folded material.

In the drawings:

FIG. 1 is a side elevational view of a machine which is an embodiment of the instant invention.

FIG. 2 is a view taken in section on line 2—2 of FIG. 1.

FIG. 4 is an enlarged top view of a portion of an endless conveyor forming a part of the instant invention particularly showing a work-holding clamp.

FIG. 5 is a front elevational view of the parts shown in FIG. 4.

FIG. 6 is a side elevational view of the parts shown in FIG. 4.

FIG. 7 is a view similar to FIG. 6 with the side plate removed to expose details of the holding clamp.

FIG. 8 is an enlarged sectional detail view of a portion of the holding clamp showing the clamp in a position to receive a fold of the web.

FIG. 9 is a view similar to FIG. 8 showing the clamp in a web-retaining position.

FIG. 10 is an elevational side view of the machine showing detail sections of interrelated portions.

FIG. 11 is a transverse view taken on line 11—11 of FIG. 10.

FIGS. 12–16 are diagrammatic views in side elevation to illustrate successive positions of the parts in the operation of the machine.

FIGS. 17–20 are views in perspective illustrating the material in successive stages of the folding process.

Figure 3:
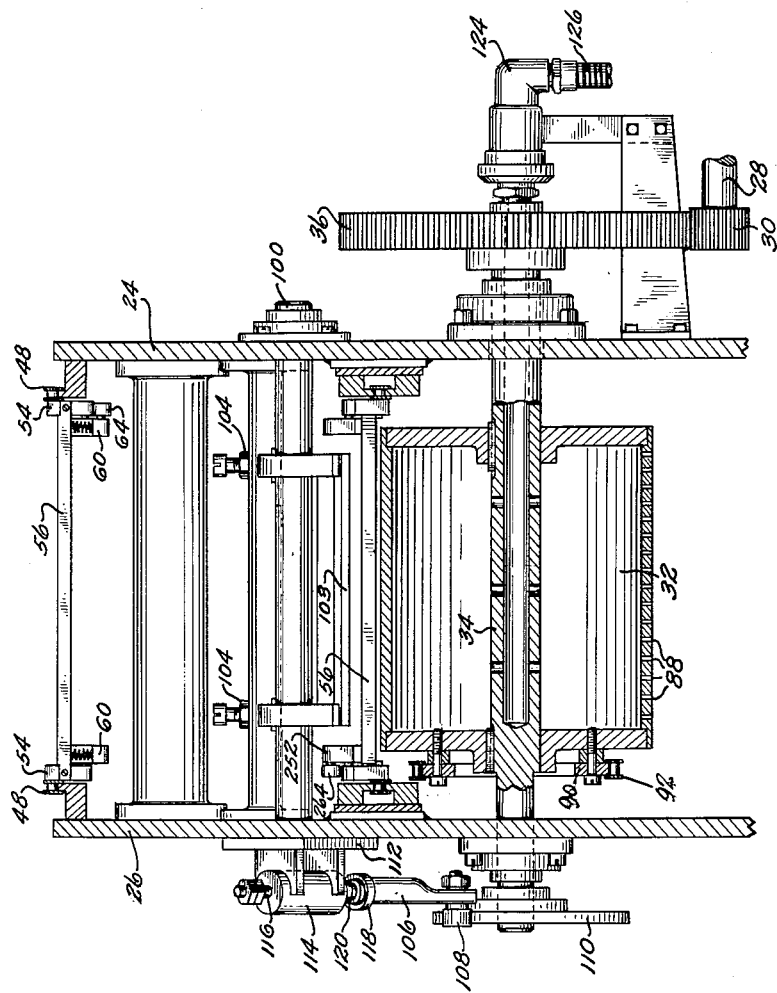
FIG. 3 is a view taken in section on line 3—3 of FIG. 1.

The main drive shaft 34 receives power from a shaft 28 through gears 30 and 36. Shaft 34 is journaled in frame sides 24 and 26 and supports vacuum drum 32 as shown in FIGS. 3 and 10. This drum is the intermediate drum in a set of three. At its left, as viewed in FIG. 10, is drum 38 on shaft 40. At its right is drum 42 on shaft 44.

The several drums 32, 38 and 42 have sprockets 46 fixed to their ends. A conveyor 48, comprising laterally spaced link chains, is trained about the sprockets 46 and about relatively adjustable end sprockets 45 and 47, respectively, mounted on frame sides 24 and 26. Conveyor 48 drives roller 38 from roller 42. Roller 42 is driven from rollers 32 through a pair of sprockets 90 on shafts 34 and 44, respectively, and on interconnecting chain 92.

Guide roller 50 is journaled in first and second sides 24 and 26 of machine base 22 spaced obliquely below and toward the material receiving end of machine 20.

A plurality of clamps 52 are shown connected to conveyor 48 at predetermined intervals. These clamps are designed to receive a folded bight of web and to support the folded web without creasing the fold. Referring to FIGS. 4 through 9, it can be seen that a representative clamp 52 comprises a set of end plates 54 connected to respective conveyor chains 48. A relatively fixed jaw 56 is fixedly mounted on end plates 54 to span the space between the chains. A relatively movable jaw 58 is mounted on bell cranks 60 respectively pivoted by means of pivot pins 55 to the end plates 54. Compression springs 62 seating on the fixed jaw 56 bias the bell cranks 60 to urge jaw 58 toward jaw 56. As best shown in FIGS. 8 and 9, the respective jaws 56 and 58 have complementary gripper portions 57 and 59 attached thereto. These are desirably resiliently yieldable being made of rubber or other elastomeric material.

The respective gripping portions of the jaws have opposing faces 570 and 590 which slant in upwardly diverging directions away from a line of contact near their lower margins. The faces 570 and 590 diverge to insure that the material placed between them will have a soft fold rather than a crease.

For operating the relatively movable jaw to open position, its bell crank support 60 is provided with cam follower roller 64 which interacts with a cam on frame side 24 as hereinafter described.

A plurality of such clamps 52 are connected to endless conveyor chains 48 at predetermined spaced intervals. Alternate clamps 252 are identical with clamps 52 with the single exception that their cam follower rollers 264 are mounted adjacent frame side 26, whereas the rollers 64 are adjacent frame side 24.

The web to be folded is tucked into the jaws of clamps 52 as follows:

The drum 38 shown at the left in FIG. 10 is hollow and rotatably mounted on bearings 66 and 67 on fixed shaft 40.

A tucking blade 84 which forms a loose transverse fold in a web traversing the drum 38, and introduces a bight of such fold between the jaws of a clamp 52, is mounted on crosshead 82 within the ends of the drum and arranged to be projected and retracted through a slot 86 in the periphery of the drum. The crossheads 82 are mounted on push rods 74, 75 which, at each end of the drum, are spaced at opposite sides of the drum shaft 40 and reciprocably guided in the push rod mounting plates 70 and 71 fixed interiorly to the ends of the drum 38.

In addition to the connection of the push rods 74, 75 by the crossheads 82 which support the tucking blade 84, the push rods are also connected near their opposite ends by crosshead 77 which receives the thrust of compression springs 78, 79 that encircle the respective push rods and are seated on the fixed seat member 76, through which the push rods project.

Corresponding cams 68, 69 are keyed to the fixed shaft 40 near the respective ends of drum 38 and they interact with cam follower rollers 80 on the respective crossheads 77, the arrangement being such that whenever the drums rotate to a position such that the roller 80 rides into the reduced-radius portions 690 of the cams 68, 69, the compression springs 78, 79 will project the tucking blade 86. At all other times, the engagement of the roller with the constant radius portions of the respective cams will hold the push rods 74, 75 and the tucking blade retracted.

The drum 42 which is at the right in FIG. 10 is identical in all respects with the drum 38 except that its cams 268 and 269 are rotated differently with respect to shaft 44 and the timing of its tucking blade 284 is offset from that of tucking blade 84 so that the tucking blades of the respective drums will interact with alternate clamps 52 and 252 respectively. The tucking blade 84 of drum 38 is shown in FIG. 10 to be projected while the tucking blade 284 of drum 42 is retracted.

A cam 126 affixed to the far side frame member 24 as shown in FIG. 10 lies in the path of the cam follower roller 64 of the bell crank lever 60 which supports movable jaw 58 of the respective clamps 52, the arrangement being such that the movable jaw is withdrawn from the fixed jaw 56 in registry with the projection of the tucking blade 84 to receive a bight of the work 12 as shown in FIG. 8. As the tucking blade is retracted, the grip 59 of jaw 58 closes toward the grip portion 57 of jaw 56 to engage the work just below its bight 590 as shown in FIG. 9 whereby to produce a soft fold rather than a creased fold therein.

During continued advance of the work, the web is severed intermediate the successive folds thus made and its free ends are superposed preliminary to a further transverse fold made by the tucking blade 284 of the final drum 42 traversed by the work. Means for severing the web and superposing its free ends will now be described.

In FIG. 3 and FIG. 10, the intermediate drum 32 is shown mounted on second shaft 34 to rotate therewith. Drum 32 is connected through its tubular shaft 34 and swivel coupling 124 with vacuum line 126. Its periphery has a plurality of ports 88 spaced according to a predetermined pattern throughout approximately one half of the cylindrical surface of drum 32.

A cutting blade 98 is fixed to drum 32 immediately adjacent to the commencement of the ported area of the surface of drum 32.

A rock shaft 100 is journaled in the sides 24 and 26 of the machine frame 22. A cutting blade 103 complementary to blade 98 is affixed to rock shaft 100 by arms 104. A rocker arm 106 is affixed at one end to the end of rock shaft 100 and carries cam follower roller 108.

Cam 110 fixed to shaft 34 in the same vertical plane as cam follower roller 108 has a large radius portion and a small radius portion relative to shaft 34 for oscillating rock shaft 100 (FIGS. 1 and 3). The cam follower roller 108 is held to the periphery of cam 110 by a spring 120 seated in housing 114 and acting on rocker arm 106 as shown in FIG. 1. Relatively movable knife blade 103 is held normally retracted by camming action of the large radius portion of cam 110.

As shaft 34 rotates to bring cutting blade 98 into position for interaction with retractable blade 103, the latter is moved down into position by the biasing action of spring 120 holding cam follower roller against the small radius portion of cam 110. Continued operation brings about retraction of blade 103 to clear the next clamps 52 and 252.

The timing of the machine is such that the web is severed approximately midway between the bights formed therein by the tucking of a fold 590 of the web into one of the clamps 52 of the conveyor. The trailing free end 117 of the severed web falls free beyond the drum 32 and is superposed upon the leading free end 116 of the web beyond the bight. The leading free end 116 of that portion of the web which is behind the point of severance tends to cling to the perforated peripheral portion of drum 32 by reason of the vacuum in such drum, as shown in FIG. 14. Hence the leading free end created by the severance follows the drum 32 away from the path of the conveyor, ultimately being stripped therefrom as shown in FIG. 10 to lie against the periphery of drum 42 as shown in FIG. 13 where the trailing end 117 created by the next web-severing-operation will fall upon it as shown in FIG. 14.

A further cross fold is now made in the once folded severed length of web at 591 (FIGS. 15, 16 and 20).

A second cam 128 similar in construction to cam 126 is attached to frame side 26 in the path of the follower rollers 264 of the alternate clamps 252. The arrangement is such that the jaws of clamps 52 cooperate only with tucking blade 84 of drum 38 while the jaws of clamps 252 cooperate only with tucking blade 284 of drum 42.

As the conveyor carries a given clamp 252 around the drum 42, the jaws of such clamp 252 are opened to receive the bight 591 as shown in FIG. 14 and, as the tucking blade 284 is retracted, the jaw is closed upon the bight 591 and carries it free of drum 42 as shown in FIGS. 15 and 16.

Third cam 130 is connected to side 24 of machine base 22 and extends over conveyor 48. Cam 130 is attached to side 24 so that its cam surface initiates movement of a cam follower roller 64 at a point where conveyor 48 ceases engagement with drum 42. The work now folded as shown in FIG. 19 and the third cam 130 opens the jaws of clamp 52, thereby releasing bight 590 now the leading edge of the work product. The leading edge of the work product will drop down due to the effects of gravitational pull, hanging downwardly from a second clamp 252. Second clamp 252 will carry bight 591 and the trailing portion of the work product across drum 42 until the trailing portion is superposed on the leading portion due to the attraction of gravity on the trailing portion.

Fourth cam 132 is connected to side 26 of machine base 22 and extends over conveyor 48. Cam 132 is attached to side 26 so that its cam surface initiates movement of a cam follower roller 264 at a point where conveyor 48 extends approximately one-third of the way over the conveying surface of a conveyor 134.

Conveyor belt 134 having a plurality of ports 158 therein is trained over the open portion of a hollow vacuum casing 146 having a vacuum pipe connection at 147. Casing 146 is elongated and has a pair of rollers 148 and 150 journaled therein providing a track for conveyor 134. A bracket 152 is fixed to the side of hollow casing 146 and a guide roller 154 is adjustably journaled therein for the purposes of adjusting tension of conveyor 134. A drive gear 142 is fixed to the end of shaft 44 adjacent to side 26 of the machine base 22. A driven gear 144 is mounted on the same shaft as roller 148 of conveyor 134 and in the same vertical plane as drive gear 142. Driven gear 144 is smaller than drive gear 132 for reasons to be explained later. Sprockets 138 and 140 fixed to side 26 of machine base 22 in the same vertical plane as drive gear 142 and driven gear 144, take up the slack in a drive chain 156 which driveably connects first and second conveyors 48 and 134 through gears 142 and 144.

The work will now have been folded as shown in FIG. 20 and the action of fourth cam 132 is such as to open the jaws of clamp 252 thereby releasing bight 591 and depositing the finished work product onto conveyor 134. Drive gear 144 is smaller than drive gear 142, as previously explained, so that the speed of conveyor 134 is slightly greater than the speed of conveyor 48 thereby insuring that as the work product is deposited upon conveyor 134 it is pulled out by the relative differential in speed and is held in place by vacuum so that the work product is wrinkle free.

FIG. 17 shows the finished product 160 opened to show the folds made therein by the operations above described. The longitudinal fold bends 161, 162, 163 will have been made preliminarily by conventional folders with which the present invention is not concerned. The first transverse fold is shown at 590; the free ends appear at 116 and 117; and the folds resulting from bight 591 appear at 591a and 591b.

I claim:

1. In a web cutting and folding machine the combination with means defining the path of a web to be folded into bights, of a conveyor having a run extending along said path, clamps longitudinally spaced on the conveyor and comprising relatively movable web-receiving jaws, means for actuating said jaws between relatively open and closed positions, means for periodically tucking successive bights of said web between the jaws of clamps spaced longitudinally of said conveyor, means for severing the web intermediate bights thereof engaged by said spaced clamps, means for effecting superposition of portions of a length of web thus severed while an intermediate bight thereof remains engaged by one of said clamps, whereby said web length is folded intermediate its ends, and means for engaging a bight of the folded web in the jaws of another clamp of said conveyor whereby to effect a second fold therein.

2. The combination set forth in claim 1 in which the means for effecting superposition of portions of the severed length of web comprises a rotatable cylinder having vacuum connections and peripheral ports, said web-severing means being mounted on said cylinder and said ports being disposed on the peripheral portion of the cylinder following the web-severing means in the direction of cylinder rotation whereby a web end following the point of severance will be held by vacuum to said cylinder and withdrawn thereby from the path of movement of said conveyor run.

3. The device of claim 1 in which the respective tucking means comprise cylinders to which said conveyor run is approximately tangent, and tucking blades reciprocable from and into the periphery of the cylinder in timed synchronism with movement of said conveyor run and the clamps mounted thereon, the conveyor run having separate clamps with which the respective blades interact in producing the first and second folds in said web.

4. The device of claim 3 in which the cutting means comprises an intermediate cylinder disposed between the aforesaid cylinders carrying the tucking blades, the cutting means comprising a knife on said intermediate cylinder and a knife retractably mounted for coaction therewith and having means for its retraction in synchronism with passage of clamps on said conveyor run.

5. The device of claim 4 in which said intermediate cylinder is further provided with peripheral vacuum ports immediately following the cutting blade and with vacuum connections for withdrawing air from its interior.

6. The device of claim 1 in which the jaws of the respective clamps comprise beveled grip portions, and said tucking means comprise blades and means for projecting them materially beyond the line of engagement of said jaw grip portions, whereby the bight of the web engaged by the grip portions when the jaws close comprises an uncompressed loop.

7. In a machine for making a soft fold in the bight of a web, the combination with a pair of relatively movable jaws having margins proximate the web to be folded and provided near said margins with narrow opposed clamping means for a narrow line of engagement with the web to be folded and beyond which full relief from pressure of said clamping means is provided, means mounting the jaws for relative movement of one toward the other, and means for effecting such movement in a web engaging and web releasing direction, of a tucking blade movable between said jaws for introducing therebetween a bight of a web to be engaged by the jaws, means mounting the blade for movement and means for effecting blade movement to an advanced position between said jaws and retracting position externally thereof, said means for effecting blade movement being adapted to effect a sufficient range of blade movement to a point sufficiently remote from said clamping means so that said bight will be free of clamping pressure so that a bight of web material introduced by said blade between the jaws will be advanced beyond the line of engagement of said clamping means therewith to form a loose loop beyond such line.

8. In a web cutting and folding machine the combination with means for folding a length of web upon itself, said means including a tucking blade and a cooperating jaw and conveyor means having rectilinear flights upon which the jaw is mounted for advancing the jaw with the folded web, of means disposed along the path of advance of the folded web for thereafter severing from the web a length of web containing the fold, means for effecting registration of end portions of the said length of web upon each other, and means including a further pair of clamping jaws and a further tucking blade for transversely folding the once folded and severed length of web.

9. In a web folding and severing machine the combination with a conveyor comprising endless chains having corresponding guides over which said chains are trained in parallel spaced relationship, clamping jaws in pairs mounted at their ends upon the respective chains and having means supporting one of said jaws for movement to and from engagement with the other, cylinders having tucking blades mounted therein for generally radial movement between advanced and retracted positions, the said cylinders being disposed at spaced points along the path of conveyor travel, means for projecting the blades in synchronism with conveyor movement to engage in successive pairs of jaws bights of web material trained over said cylinders, and means between said cylinders for severing a length of web material after a first bight thereof has been engaged between one pair of jaws of said conveyor and before a second bight thereof has been engaged between another pair of jaws on said conveyor.

10. In a web folding and severing machine the combination with frame sides, of endless conveyor elements operating in proximity to respective sides, guide means over which said conveyor elements are trained, sets of paired clamping jaws mounted at their ends from respective conveyor elements and extending transversely between said frame sides, each such set including a first pair of clamping jaws and a second pair of clamping jaws in closer proximity to each other within the set than to the jaws of other sets, means biasing one jaw of each pair toward the other jaw of each pair, means including a cam follower connected with the biased jaw for opening it from the jaw toward which it is biased, and fixed cams connected with respective frame sides and disposed in the path of the cam followers, one such cam being adapted to open the jaws of the first pair in each successive set and another such cam being adapted to open the jaws of the second pair in each successive set.

11. The subcombination defined in claim 10 in further combination with tucking means mounted between the frame sides in spaced positions along the path of conveyor movement and respectively adapted to interact with open jaws of successive first pairs and with open jaws of successive second pairs.

12. The device of claim 11 in which the tucking means comprises radially reciprocable blades mounted in web supporting drums, the drum being provided with sprockets constituting the guide means over which the conveyor elements are trained, said elements constituting chains meshing with said sprockets, and cam means for reciprocating said blades in the course of drum rotation in synchronism with conveyor advance and the opening and closing of the jaws of the respective pairs.

13. The combination with a conveyor comprising laterally spaced chains, relatively fixed and movable jaws mounted at their ends upon said chains and spanning the interval therebetween, means for moving one of said jaws toward and from the other end means for introducing between said jaws a bight of web to be clamped therebetween, said means including a drum having at least one sprocket meshing with at least one of said chains, a fixed shaft about which said drum is revoluble, a tucking blade for which said drum is provided with a peripheral slot and has guide means in which the blade is radially reciprocable through said slot, a cam follower connected with said blade and a fixed cam connected with said fixed shaft and with which the cam follower is operatively engaged to effect reciprocation of said blade through said slot in the course of rotation of the drum and in synchronism with the movement of said jaws with said chain.

14. In a machine for cutting and folding material the combination comprising: three laterally spaced cylindrical drums mounted for rotation and including a central drum and first and second end drums; a source of driving power connected to said central drum; an endless conveyor interconnecting said three drums; said endless conveyor engaging said central drum to be driven by said central drum and engaging said first and second end drums to drive said first and second end drums; said first and second end drums being hollow and rotatably mounted on fixed axles; first and second tucking blades mounted in said first and second end drums respectively; the cylindrical surfaces of said first and second end drums being slotted to pass said blades; means including cams fixed to said axle for alternately projecting and retracting said blades through said axial slots in response to driving action of said endless conveyor rotating said drums; cutting means including co-acting knives respectively having a fixed mounting and a mounting on said central drum; said cutting means cooperating to operate in response to rotating movement of said central drum; first and second clamps mounted on said endless conveyor in pairs at predetermined spaced intervals; and a plurality of clamp-operating cams mounted in laterally spaced relation on said machine; whereby when a web of material having a continuous length and a predetermined width is fed into said machine said first tucking blade lifts said material in a cross fold and inserts said material in said fold into a first clamp; said first clamp carrying said material over said central drum; said cutting means in response to rotating movement of said central drum severing said material once folded from said web; said first clamp carrying said once-folded material over said second end drum; said second tucking blade lifting said material in a fold into said second clamp; said tucking blade retracting as rotational movement of said drum and said endless conveyor continue; said first clamp releasing said material in response to camming action of a third cam of said plurality of laterally spaced cams; said second clamp carrying said material cut and twice folded to a preselected point and releasing said material at said point in response to camming action of a fourth cam of said plurality of laterally spaced cams.

15. The device of claim 14 in which said pair of drums are rotatably mounted on fixed axles, cam means are mounted within said pair of drums and cam follower means are connected to said tucking blades, said cam follower means positioned to engage said cam means whereby rotating movement of said pair of drums alternately projects and retracts said tucking blades through said slots in response to camming action of said cam means upon said cam followers.

16. The method of folding a web which method comprises rectilinearly advancing the web, forming a bight therein during the continued advance of the web, severing the web behind the bight in the course of such advance to form a free end, superposing upon each other portions of the web at each side of the bight, forming a second bight in suporposed portions of the web intermediate the severed end and the first mentioned bight, and thereafter releasing the first mentioned bight and superposing free end portions of the web upon previously superposed portions thereof adjacent said first mentioned bight.

17. The method of making and folding tablecloths continuously from a web, which method comprises rectilinearly advancing the end of the web, forming a bight therein in the course of such advance at a point spaced from such end, thereafter severing the web behind the bight to form a new end and a web section having a transverse intermediate fold at such bight, superposing the ends of said section and portions of said section between said ends and said bight while maintaining said bight, transversely folding the superposed portions of the web section and forming a second bight therein intermediate the first bight and the ends of the section, releasing the first bight and superposing it upon said free ends of the the section, and thereafter releasing the second bight.

References Cited in the file of this patent
UNITED STATES PATENTS

| | | |
|---|---|---|
| 1,108,295 | Wildman | Aug. 25, 1914 |
| 1,513,575 | Barber | Oct. 28, 1924 |